July 23, 1963 L. KATZMAN 3,098,926
VAPORIZER AND HEATING CHAMBER
Filed May 12, 1961 3 Sheets-Sheet 1
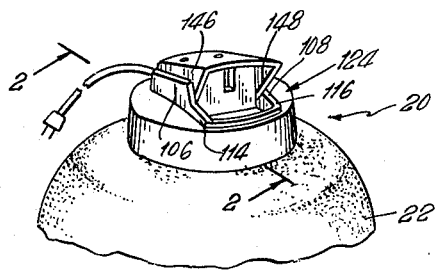
FIG. 1
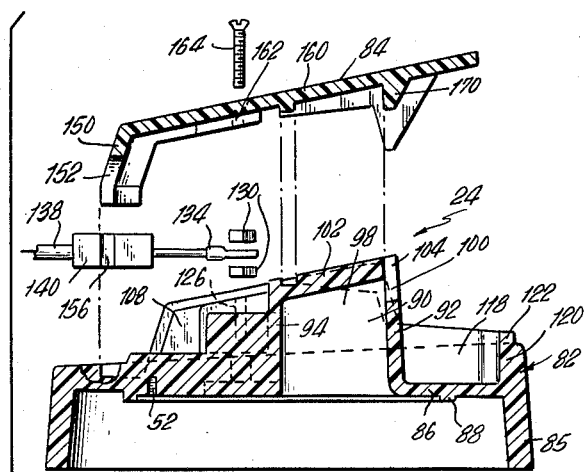
FIG. 2
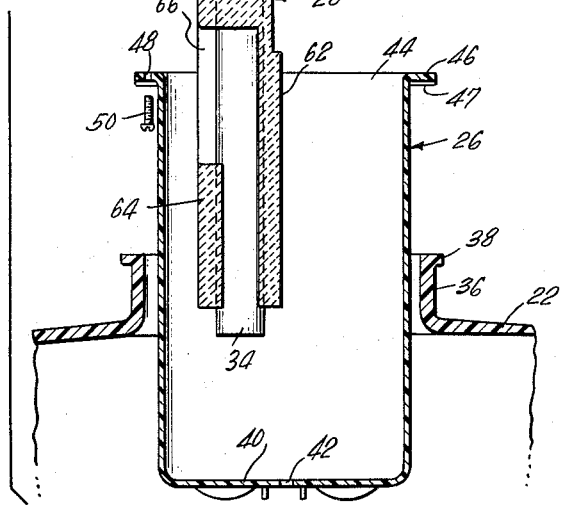
FIG. 3
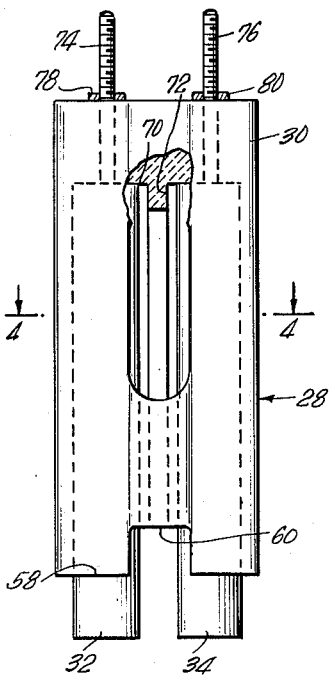
FIG. 4
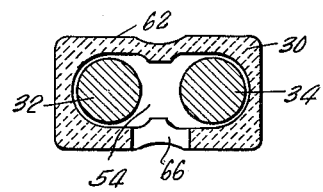
INVENTOR.
LAWRENCE KATZMAN
BY Amster & Levy
ATTORNEYS

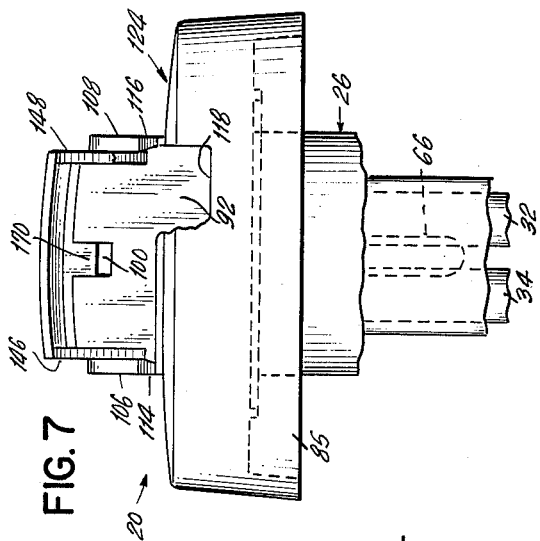

July 23, 1963
L. KATZMAN
3,098,926
VAPORIZER AND HEATING CHAMBER
Filed May 12, 1961
3 Sheets-Sheet 3
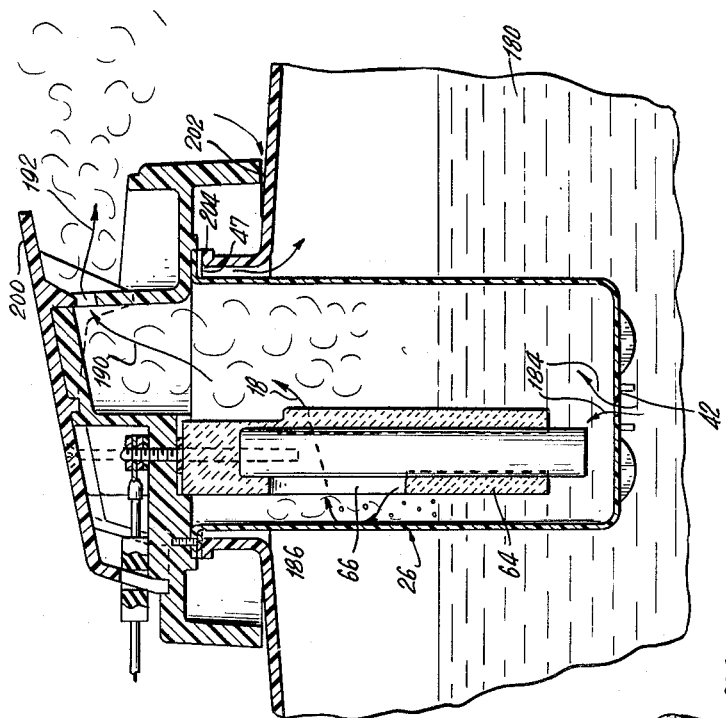
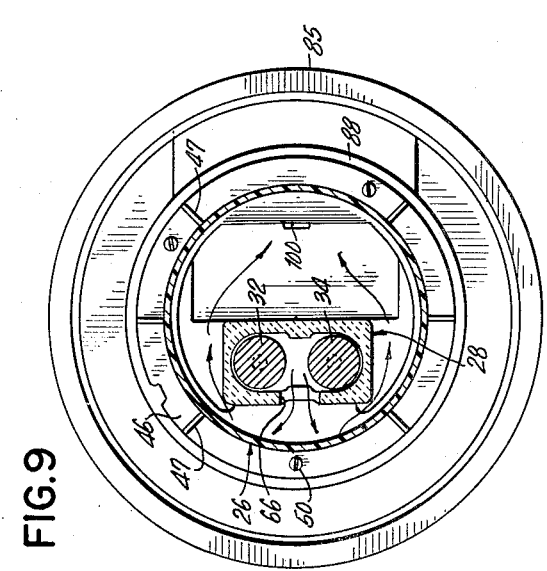
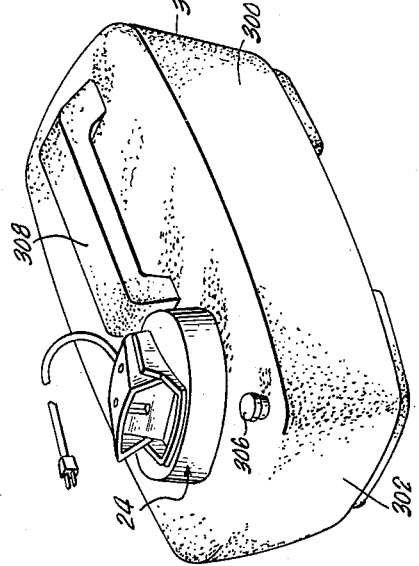
INVENTOR.
LAWRENCE KATZMAN
BY Amster & Levy
ATTORNEYS

United States Patent Office 3,098,926
Patented July 23, 1963

3,098,926
VAPORIZER AND HEATING CHAMBER
Lawrence Katzman, 11 Riverside Drive,
New York 23, N.Y.
Filed May 12, 1961, Ser. No. 109,562
2 Claims. (Cl. 219—40)

This invention relates to therapeutic appliances and more particularly to electric steam vaporizers.

In the past electrical steam vaporizers have been produced which employ a pair of spaced electrodes mounted in a heating chamber for heating water and converting the water into steam. The heating chamber is for the purpose of substantially instantaneously heating the water to change the water into steam and is arranged so that the water in the main container can flow into the heating chamber to maintain the level of the heating chamber as the steam is being produced. One of the main drawbacks of this arrangement is that in the production of steam, the water is heated to such an extent that it is agitated and very often water droplets are spattered out of the spout of the vaporizer in a manner so as to adversely effect the comfort of the patent using the vaporizer while also rendering the vaporizer somewhat less effective. This is because the hot water droplets may momentarily sting the patient or produce an undue amount of condensation of various parts of the vaporizer and the droplets themselves are useless for steam inhalation therapy.

It is therefore one of the important objects of the present invention to provide a vaporizer having the electrode assembly thereof so arranged that the hot water and steam mixture is so circulated that there is no possibility that water droplets can be spattered out of the vaporizer.

A further object of the present invention resides in the provision of a vaporizer which is arranged whereby the entire cap, heating chamber and electrode assembly can be removed simultaneously in a simple manner from the container allowing the container to be simply and easily refilled.

Another object of the invention is to provide a cap assembly formed in two parts wherein the electrode assembly may be simply secured and suspended therefrom and whereby the electric cord for connection to a source of electrical power is conveniently attached to the cap assembly and electrode in a safe and secure manner with the electrode being fully protected and insulated by the cap.

A further object of the present invention resides in the provision of a novel vaporizer having a container which is arranged to hold a considerable quantity of water for long term operation and which may easily and conveniently be carried, the vaporizer being so shaped and configurated that the center of gravity thereof is always directly beneath the handle independent of the amount of water remaining in the container.

An additional feature of the invention resides in the provision of a cap assembly which is provided with a well for receiving medication so arranged that the steam being directed out of the vaporizer passes over the medication.

Still further objects and features of this invention resides in the provision of a vaporizer that is capable of being manufactured in large quantities out of readily available material, which employs synthetic plastic materials having greater insulative qualities for most of the parts thereof.

These, together with the various ancillary objects and features of the invention which will become apparent as the following description proceeds, are attained by this vaporizer, preferred embodiments of which have been illustrated in the accompanying drawings, by way of example only, wherein:

FIG. 1 is a partial perspective view of a vaporizer constructed in accordance with the present invention;

FIG. 2 is an enlarged exploded sectional detailed view of the vaporizer showing the various parts thereof in detail and illustrating the manner in which the cap, electrode assembly and heating chamber are mounted;

FIG. 3 is an elevational view of the electrode assembly with a portion thereof being broken away to show the internal construction of the electrode assembly in greater detail;

FIG. 4 is a horizontal sectional view taken along the plane of line 4—4 in FIG. 3 illustrating the spaced electrodes of the electrode assembly.

FIG. 5 is a bottom plan view of the cover member forming one of the parts of the two piece cap;

FIG. 6 is a top plan view of a portion of the vaporizer illustrating in plan the construction of the main body of the cap;

FIG. 7 is an end elevational view of a portion of the vaporizer illustrating the construction of the cap, the heating chamber and electrode assembly;

FIG. 8 is a rear elevational view of the elements of the invention shown in FIG. 7;

FIG. 9 is a horizontal sectional view taken along the plane of line 9—9 in FIG. 7 illustrating the directional circulation of the heated fluid in the heating chamber;

FIG. 10 is a partial vertical sectional view of the vaporizer taken along the plane of line 10—10 of FIG. 6 and illustrating the manner in which the fluid circulates within the vaporizer during operations; and, FIG. 11 is a perspective view of a modified form of vaporizer employing a novel container.

With continuining reference to the accompanying drawings wherein like reference numerals designate similar parts throughout the various views, reference numeral 20 generally designates the electric steam vaporizer comprising the present invention. This vaporizer is constructed out of four major parts which include a jar or container 22 of desired shape and which is preferably blow-molded from linear polyethylene.

In addition to the jar 22 there is provided a cap assembly 24 formed of a suitable phenolic resin material such as a heat resistant Bakelite, an instantaneous heating chamber generally indicated at 26 and formed from a tube of nylon. There is also provided an electrode assembly 28 including an insulating mounting member 30 and a pair of carbon electrodes 32 and 34. In the form of the invention as was shown in FIGS. 1 through 10, the container 22 is formed in any suitable shape and the jar is provided with a neck 36 preferably provided with a peripheral flange 38 at the upper edge thereof.

The instantaneous heating chamber 26 which is in the form of a cylindrical nylon tube has a bottom wall 40 provided with an opening or openings 42 therein. The tube 26 is further provided at the open end 44 thereof with a peripheral flange 46 having a plurality of apertures 48 therethrough. Screw type fasteners 50 are adapted to extend through the apertures 46 for securement in suitable threaded recesses 52 in the cap assembly 24 so that the instantaneous heating chamber 26 is held in fixed relationship to the cap, whereby upon removal of the cap the heating chamber 26 is also removed therefrom.

The electrode assembly 28 is so arranged that the insulating body 30 which is formed of porcelain is of a general rectangular cross section provided with a vertical extending opening 54 therethrough which is formed to closely embrace the spaced pair of electrodes 42 and 44. The electrode assembly has the upper portion 56 thereof closed at the top and the electrodes 32 and 34 have the ends thereof extending below the bottom edge 58 of the insulating body 30. In addition, the lower end of the insulating body has a central portion provided with a cut away 60. The front wall 62 of the mounting member 30 is imperforate, while the rear wall 64 is provided with a horizontal passageway 66 therein. The upper ends over the electrodes 32 and 34 are seated in recesses 70 and 72 formed in the upper part 56 of the mounting member 30 and embedded in the upper portions of the electrodes 34 and 35 are metallic studs 74 and 76 formed of brass or other corrosion resistant conductive metal which are externally threaded. The studs 74 and 76 extend above the mounting member 30 and threaded cuts 78 and 80 are threadedly engaged on the studs while lockingly holding the electrodes 32 and 34 in place. The threaded studs are adapted to be secured to the cap assembly 24.

The cap assembly is formed in two parts including a main body 82 and a cover 84.

The main body 82 has a peripheral side wall 85 which is circular in cross section and adapted to surround the neck 36 of the container 22. Integrally formed with the peripheral wall 85 is an upper wall 86 which is provided with a downwardly extending peripheral flange 88 adapted to surround the peripheral flange 46 of the instantaneous heating chamber 26 when the chamber 26 is secured in place by means of the screws 50 being threadedly engaged in threaded recesses 52. There are three screws 50 in recesses of 52 employed as can be best seen in FIG. 9. The flange 88 serves to center and seat the instantaneous heating chamber 26.

Integrally formed with the upper wall 86 is a steam chamber 90 bounded by a front wall 92 and a rear wall portion 94 as well as spaced side walls 98. The front wall 92 is provided with a steam dispensing aperture 100 therein with the front wall 92 standing substantially vertically whereby the aperture 100 will form in conjunction with the cover plate 94 hereinafter to be described a suitable spout for the steam.

The top wall of the steam chamber as indicated at 102 is provided with a recess 104 therein in alignment with the aperture 100. Integrally formed with the upper wall 86 and disposed in spaced relationship of the side walls 98 of the chamber 90 are a pair of spaced walls 106 and 108 which define depressions 110 and 112 therebetween. The walls 106 and 108 have front portions 114 and 116 which together with the extension 20 of the forward portion of the peripheral wall 84 define a well 118. Extending above the extension 120 is a flange 122 which further aids in defining the shape of the well 118. The well 118 is adapted to receive suitable medication therein so that steam passing out of the aperture 120 will pick up vapors from the medication in the well 118 for providing steam inhalation therapy to the person using the vaporizer.

The main body 82 is further provided with a pair of openings 126 therein through which the threaded studs 74 and 76 extend which studs are held in place by suitable nuts 130 and 132. The nuts 130 and 132 also hold in place connectors 134 and 136 attached to the wire cord 138 and which passes through a resilient grommet 140 or like fitting which is held in place between the cover 84 and the main body 82.

The cover 84 is provided with a pair of spaced downwardly extending flanges 146 and 148 which are adapted to extend into the depressions 110 and 112. Further, the cover 84 is provided with a rear wall 150 having a recess 152 therein so arranged that the portions on either side of the recess 152 of the rear wall 150 will lock in an annular groove 156 formed in the fitting 140 as can be best seen in FIG. 6 holding the fittings in position and serving to safeguard the device should there be any strain on the electric cord 138. The cover 84 is provided with an angularly upwardly extending cover plate 160 having apertures 162 therethrough for reception of screws 164 or the like which are threadedly engaged in threaded recesses 166 formed in the main body 82. The cover 84 is further provided with a detent 170 which is adapted to fit in the recess 104 to lockingly hold the cover 84 in place.

When the entire device is assembled, it will be noted that the electrode assembly 28 is disposed with the rear wall 64 thereof adjacent the tube of the heating chamber 26 while the front wall 62 thereof is spaced substantially essentially of the instantaneous heating chamber. Fluid 180 which is disposed within the container 22 rises to the same level in the instantaneous heating chamber 26 due to the fact that it passes through the openings 42 therein in the direction indicated by arrows 184. With the electrodes 32, 34 connected to a source of electrical power through the cord 138, water between the electrodes is heated and immediately passes out of the openings 66. The heated water which is in the form of steam and droplets of water will be directed against the side wall of the instantaneous heating chamber 26 whereby any droplets of water will adhere to the container while the steam itself will pass upwardly from the container in the direction indicated by arrows 186, 188, 190 and 192 and through the steam chamber 90 out of the aperture 100. Since the cover plate 160 has a portion overlying as at 200 the well 118, there will be formed in effect a spout and the steam will be directed to pass over the well 118 and the medication therein whereby the steam will pick up some of the medication for providing steam inhalation therapy to the patient.

It is known that in the assembly of the invention, the flange 46 of the instantaneous heating chamber 26 rests on the peripheral flange 38 of the neck 36 whereby the cap 24 is spaced above the container so as to form a peripheral air inlet 202 so that air may pass through the ribbed opening 204 from the ribs 47 between the flange 46 and the flange 38, then into the container 22 to provide air for taking up the space of the water which has been boiled off into steam. A vacuum is prevented from occurring in this manner. Thus, there will be only steam in the steam chamber 190 and there will not be any droplets of water which can be spit out as heretofore possible in conventional electric vaporizers. In addition, the entire assembly of the cap assembly 20, the instantaneous heating chamber 26, and the electrodes 28 can be removed from the container 22 simultaneously.

Referring now to the embodiment as shown in FIG. 11, it will be noted that herein there is disclosed a container 300 having a sloping front and rear walls 302 and 304 which converge inwardly. The cap assembly 24 is identical with the cap assembly of the other embodiments of the invention and is adapted to seat on a neck, not shown, of the container 300. A refill opening provided with a plug 306 is provided and a handle is integrally molded with the container 300 and indicated at 308 or bonded thereto in such a position that no matter what the level of fluid is in the container 300, the center of gravity of the vaporizer with the fluid therein is directly beneath the handle 308 so that the vaporizer may be carried in a horizontal position in a convenient manner.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A vaporizer comprising a container having a neck, a cap positioned on said container and including a body having a peripheral side wall surrounding said neck of said container, said body further including an upper wall provided with a downwardly extending cylindrical rim on the under surface thereof, a heating chamber secured to said upper wall centrally of said rim, said heating chamber extending into said container, an electrode assembly, studs extending through said cap suspending said electrode assembly from said cap, said electrode assembly extending into said heating chamber, said upper wall having a steam chamber integrally formed therewith in communication with said heating chamber and being further provided with a well for receiving medication, said well being formed in the upper surface of said upper wall, said upper wall having a substantially vertically extending portion between said well and said steam chamber, said vertically extending portion having an aperture therethrough so that steam passing through said aperture from said steam chamber will pass over medication in said well, an electric cord connected to said studs, a resilient fitting disposed about said cord and seating on said cap, said fitting having an annular groove therein, and a cover seated on said steam chamber and overlying said well and said aperture, said cover including portions disposed in said groove in said fitting and engaging said cap for safeguarding connections between said cord and said studs.

2. A vaporizer comprising a container having a neck, a cap positioned on said container and including a body having a peripheral side wall surrounding said neck of said container, said body further including an upper wall provided with a downwardly extending cylindrical rim on the under surface thereof, a heating chamber secured to said upper wall centrally of said rim, said heating chamber extending into said container, an electrode assembly, studs extending through said cap suspending said electrode assembly from said cap, said electrode assembly extending into said heating chamber, said upper wall having a steam chamber integrally formed therewith in communication with said heating chamber and being further provided with a well for receiving medication, said well being formed in the upper surface of said upper wall, said upper wall having a substantially vertically extending portion between said well and said steam chamber, said vertically extending portion having an aperture therethrough so that steam passing through said aperture from said steam chamber will pass over medication in said well, an electric cord connected to said studs, a resilient fitting disposed about said cord and seating on said cap, said fitting having an annular groove therein, and a cover seated on said steam chamber and overlying said well and said aperture, said cover including portions disposed in said groove in said fitting and engaging said cap for safeguarding connections between said cord and said studs, said container having fluid therein, said electrode assembly including a hollow mounting member of insulating material, said mounting member having a substantially vertical opening therein extending substantially the height of said mounting member and through the bottom of said mounting member, spaced electrodes mounted in said opening, said mounting member having an imperforate front wall and a rear wall having a substantially horizontal passageway therethrough, said passageway being above the level of the fluid, said passageway communicating with said opening, said rear wall being closely spaced to said heating chamber, said front wall being widely spaced from said heating chamber.

References Cited in the file of this patent

UNITED STATES PATENTS

| | | |
|---|---|---|
| 2,123,509 | Lawner | July 12, 1938 |
| 2,688,686 | Johnson | Sept. 7, 1954 |
| 2,777,935 | Schmitt et al. | Jan. 15, 1957 |
| 2,802,090 | Katzman et al. | Aug. 6, 1957 |
| 2,885,527 | Tone et al. | May 5, 1959 |
| 2,885,750 | Katzman et al. | May 12, 1959 |